United States Patent [19]
Ikitsu et al.

[11] Patent Number: 5,757,841
[45] Date of Patent: May 26, 1998

[54] METHOD AND APPARATUS FOR JOINING NEW ELECTRODE TO CONSUMED ELECTRODE OF ELECTRIC FURNACE

[75] Inventors: Yasuaki Ikitsu, Toyoake; Hajime Amano, Chita; Nobuyuki Kamei, Nagoya; Tetsuo Okamoto, Chita, all of Japan

[73] Assignee: Daido Tokushuko Kabushiki Kaisha, Nagoya, Japan

[21] Appl. No.: 728,077

[22] Filed: Oct. 9, 1996

Related U.S. Application Data

[63] Continuation of Ser. No. 430,304, Apr. 28, 1995, Pat. No. 5,638,398, which is a continuation of Ser. No. 26,566, Mar. 4, 1993, abandoned.

[30] Foreign Application Priority Data

| Mar. 6, 1992 | [JP] | Japan | 4-084782 |
| Mar. 6, 1992 | [JP] | Japan | 4-084784 |
| Mar. 6, 1992 | [JP] | Japan | 4-084785 |

[51] Int. Cl.$^6$ .................................................. H05B 7/14
[52] U.S. Cl. .................... 373/92; 373/94; 373/100; 29/705
[58] Field of Search ............ 373/92, 94, 88–91, 373/51–52, 100; 29/705, 714

[56] References Cited

U.S. PATENT DOCUMENTS

| 3,559,816 | 2/1971 | Hirata . | |
| 3,795,753 | 3/1974 | Mori et al. | 373/92 |
| 3,937,867 | 2/1976 | Wynne | 373/92 |
| 4,044,199 | 8/1977 | Simon | 373/92 |
| 4,400,815 | 8/1983 | Dunn et al. | 373/92 |
| 4,420,838 | 12/1983 | Dunn et al. | 373/92 |
| 4,736,384 | 4/1988 | Sakai et al. | 373/92 |
| 5,201,112 | 4/1993 | Sevelinge . | |
| 5,638,398 | 6/1997 | Ikitsu et al. | 373/92 |

FOREIGN PATENT DOCUMENTS

| 3445830 | 6/1986 | Germany . |

*Primary Examiner*—Tu B. Hoang
*Attorney, Agent, or Firm*—Sughrue, Mion, Zinn, Macpeak & Seas, PLLC

[57] ABSTRACT

A new electrode is joined to a consumed electrode of the electric furnace according to a method comprising the steps of lifting and transporting the new electrode suspended from a joining apparatus by a crane, aligning both electrodes by throwing a laser beam from a projector disposed to the crane on a positioning marker disposed on a deck plate provided in the vicinity of the electric furnace, screwing a screw thread of the new electrode into a threaded hole of the consumed electrode by actuating an electric motor disposed in the joining apparatus, and tightening both electrodes at desired tightening torque by operating the motor in a stalled state with a small electric current of low frequency.

1 Claim, 13 Drawing Sheets

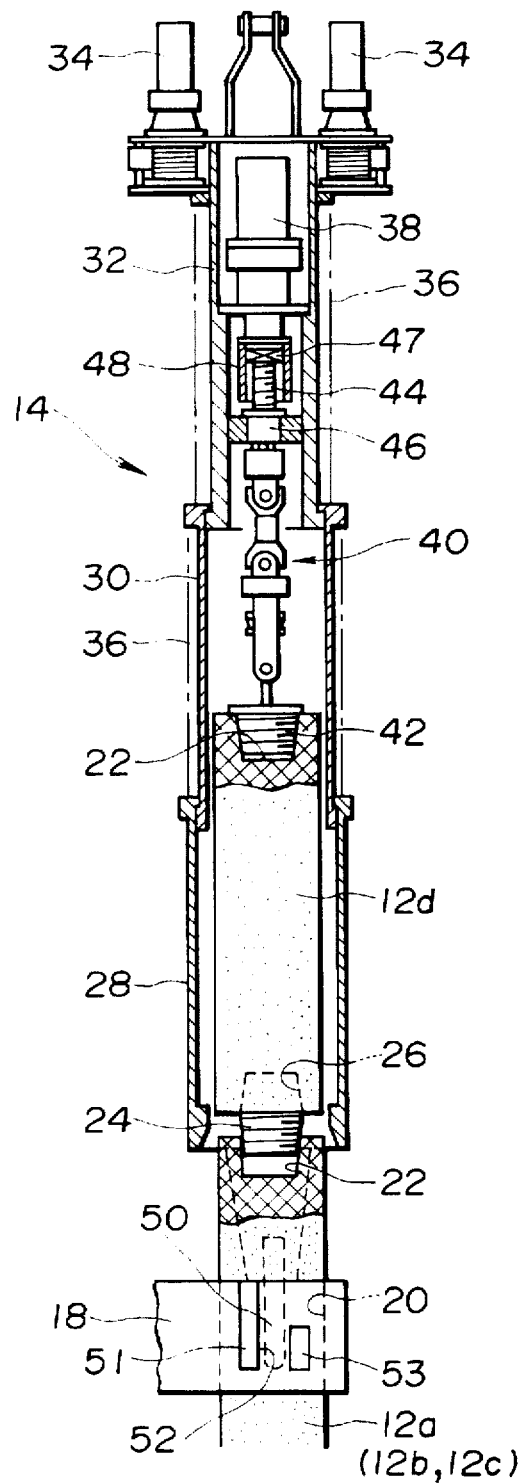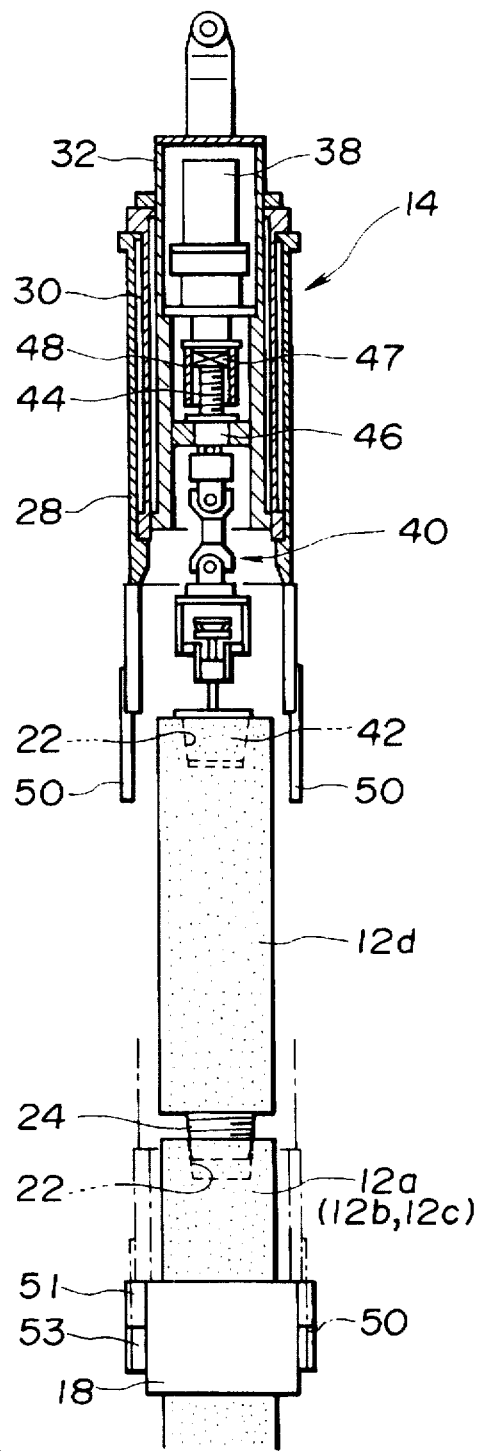

METHOD AND APPARATUS FOR JOINING NEW ELECTRODE TO CONSUMED ELECTRODE OF ELECTRIC FURNACE

This is a continuation of application Ser. No. 08/430,304 filed Apr. 28, 1995, now U.S. Pat. No. 5,638,358 which in turn is a continuation of application Ser. No. 08/026,566 filed Mar. 4, 1993, now abandoned.

BACKGROUND OF THE INVENTION

1. Field of the Invention

This invention relates to a method and an apparatus used for joining a new electrode to an old and consumed electrode fitted to an electric furnace, and in particular to a method for aligning both axes of the new and the consumed electrodes, a method for controlling an electric motor in order to tighten both the electrodes with each other, and an apparatus for lifting the new electrode and rotating the new electrode so as to screw and tighten both the electrodes with each other.

2. Description of the Prior Art

In an electric furnace used for manufacturing, for example, steel, ferro alloy and so on, by generating arc between electrodes and materials charged in a hearth, the electrodes are consumed according to continuation of the operation. Therefore, in the electric furnace of this kind, the electrodes supported with electrode holders of the electric furnace are so designed as to be fed into the furnace according to the consumption of the electrodes through electrode holes disposed in a furnace cover, and are extended by adding new electrodes to the old and consumed electrodes.

Heretofore, on the occasion of joining the new electrode to the old and consumed electrode, a new electrode 100 to be added to a consumed electrode 106 is suspended by a crane 102 through a joining apparatus 103 and moved to a position just above the consumed electrode 106 of an electric furnace 104 as shown in FIG. 11. Subsequently, the new electrode 100 is joined to the old and consumed electrode 106 fitted to the electric furnace 104 through a holder arm 105 by rotating the suspended new electrode 100 with an electric motor disposed in the joining apparatus 103 at the same time of lowering the new electrode 100 to screw a screw thread 108 formed on its lower end into a threaded hole 110 formed in the upper end of the consumed electrode 106 of the electric furnace 104.

However, in such the method for joining electrodes 100 and 106, it is difficult to align the axis of the new electrode 100 suspended from the crane 102 with the axis of the consumed electrode 106 of the electric furnace 104 accurately, and there is a problem since it requires much labor and time to align the axes of both the electrodes 100 and 106.

Additionally, at the time of screwing the screw thread 108 of the new electrode 100 into the treaded hole 110 of the consumed electrode 106 by rotating the new electrode 100 through the electric motor of the joining apparatus 103, it is difficult to make the final tightening torque applied on the threaded portions 108 and 109 regular always because of subtle differences in size of the threaded portions 108 and 109 caused by scattering of manufacturing accuracy. Accordingly, there is the possibility that the threaded portions 108 and 110 are tighten insufficiently or excessively depending on circumstances.

Namely, at the time of screwing the screw thread 108 of the new electrode 100 into the threaded hole 110 of the consumed electrode 106 to tighten both the electrodes 100 and 106 by rotating the new electrode 100 through the electric motor of the joining apparatus 103, the electric motor is put into an overload state when both the electrodes 100 and 106 are tighten in some degree, and is brought to a standstill, that is the motor falls into a stalling state.

Stalling operation means to work the motor in such the overload state, an electric current flowing in the motor is held constant and torque output from the motor shows fixed value in this state.

Generally, if the motor is connected to the source of commercial electric power supply and operated in the stalling state, an overcurrent flows in the motor, the motor overheats and is burned out before long.

Therefore, the electric motor is prevented from the overheating by cutting off the power supply at the same time the motor falls into the stalling state in the conventional method. In such the method, however, it is impossible to apply the tightening torque required for tightening both the electrodes 100 and 106 to the threaded portions 108 and 110.

Consequently, there is another problem in that the threaded portions 108 and 110 generate heat owing to increase of electric resistance therebetween if the threaded portions 108 and 110 are tightened insufficiently, and threads of the threaded postions 108 and 110 may be broken by tightening them excessively, thereby causing disconnection of the electrodes and deterioration of the lifetime of the electrodes.

Furthermore, although the new electrode 100 to be added to the consumed electrode 106 is generally packed horizontally and stored in a state of being laid down on the floor as shown in FIG. 12, a connector 103 a of the conventional joining apparatus 103 is merely possible to be connected with the new electrode 100 in a standing state. Therefore, it is necessary to set up the electrode 100 laid on the floor and set it in the standing position in order to connect the new electrode 100 to the connector 103a of the joining apparatus 103.

Accordingly, a problem arises in that it requires much time and hard labor to set the electrode 100 to the joining apparatus 103.

SUMMARY OF THE INVENTION

This invention is made in view of the aforementioned problems of the prior art and an object of the invention is to provide a method for joining a new electrode to a consumed electrode of an electric furnace which is possible to align axes of both electrodes very easily and possible to tighten both the electrodes with each other at a predetermined suitable tightening torque, and an apparatus for joining the new electrode to the consumed electrode of the electric furnace which is possible to be connected with the new electrode without hindrance even if the new electrode is stored in a state of being laid on the floor.

The method for joining a new electrode to a consumed electrode fitted to an electric furnace according to an aspect of this invention is characterized by comprising the steps of lifting and transporting the new electrode by a carrier means to a position above the consumed electrode of the electric furnace, aligning axes of both the electrodes with each other by adjusting a light from a projector means disposed on one side of the carrier means and a stationary member provided in the vicinity of the electric furnace to a positioning marker disposed on the other side of the carrier means and the stationary member, and screwing a screw thread formed on one of both the electrodes into a threaded hole formed in the other electrode so as to tighten both the electrodes with each other.

In the method according to this aspect of the invention, the projector means such as a laser beam projector is disposed either on the carrier means such as a crane or on the stationary member provided in the vicinity of the electric furnace, for example on the crane, and the positioning marker is disposed on the stationary member. Therefore, it is possible to transport the extensional new electrode into the objective position speedily and possible to stop the electrode at the objective position very exactly by moving the crane so that the laser beam from the projector may shine on the positioning marker as checking a spot struck by the laser beam.

The method for joining a new electrode to a consumed electrode fitted to an electric furnace according to another aspect of this invention is characterized by comprising the steps of lifting the new electrode by a carrier means through a joining apparatus provided with an electric motor for rotating the new electrode about its axis, transporting the new electrode by the carrier means to a position just above the consumed electrode of the electric furnace, screwing a screw thread formed on one of both the electordes into a threaded hole formed in the other electrode by actuating the electric motor of the joining apparatus, and tightening both the electrodes with each other at .predetermined tightening torque applied from the electric motor of the joining apparatus in a stalling state by controlling the electric motor so as to harmonize stalling torque of the electric motor with the predetermined tightening torque.

In the method according to the second aspect of this invention, both the electrodes are tightened with each other at predetermined tightening torque applied from the electric motor in the stalling state by controlling the motor so as to harmonize stalling torque of the motor with the predetermined tightening torque required for tightening the electrodes neither too much nor too less.

Namely, an stalling current which is an electric current flowing in the electric motor in the stalling state decreases in proportion to the decrease of voltage and frequency of the current supplied to the electric motor. Therefore, it is possible to lower the stalling current so as not to overheat the motor by controlling the voltage and the frequency of the electric current to be supplied to the motor.

Additionally, the torque applied from the motor becomes larger according as the frequency of the electric current becomes lower when the current intensity is the same.

In the method of the second aspect according to this invention, the electric motor of the joining apparatus is controlled so that the desired torque may be obtained by a certain stalling current and the stalling current may be lowered so as not to overheat the motor, and both the electrodes are tightened with stalling torque output form the motor in the stalling state.

According to the method of the second aspect, it is possible to obtain proper tightening torque in safe, and possible to prevent the electrodes from the disconnection and extend the lifetime of the electrodes.

The joining apparatus for joining a new electrode to a consumed electrode vertically fitted to an electric furnace through a holder arm is characterized by comprising a drive means for driving rotationally the new electrode suspended vertically about an axis of the new electrode, a transmission means connected to the drive means on the upper side thereof for transmitting rotational driving power of the drive mans to the new electrode, a connector means disposed on the lower side of the transmission means for connecting the new electrode with the transmission means, and a rotatable joint means for turning a lower side portion of the transmission means together with the connector means into a horizontal position from a vertical position or conversely to this.

In the joining apparatus according to this invention, the lower side portion of the transmission means including the connector means is so designed as to be rotatable by the rotatable joint means from the vertical position into the horizontal or substantially horizontal position.

Accordingly, it is possible to connect the new electrode to the transmission means through the connector means without hindrance even if the new electrode is stored in the state of being laid on the floor.

Subsequently, the new electrode is set up vertically from the lying position by lifting the new electrode by the carrier means such as a crane through the joining apparatus according to this invention.

The new electrode suspended vertically is transported to the position just above the consumed electrode of the electric furnace supported through the holder arm, and the new electrode connected to the transmission means through the connector means is joined to the consumed electrode of the electric furnace by transmitting the driving force to the new electrode from the drive means through the transmission means and rotating the new electrode.

According to the joining apparatus of this invention, it is possible to set the new electrode left in the state of being laid on the floor to the joining apparatus very easily, whereby setting work of the new electrode to the joining apparatus is remarkably simplified. Furthermore, it is possible to decrease the work of operators because the work is unnecessary anymore for setting up the electrode in the standing position.

BRIEF DESCRIPTION OF THE DRAWINGS

FIGS. 2A and 2B are enlarged vertical sectional views illustrating the joining apparatus shown in FIG. 1;

DESCRIPTION OF THE PREFERRED EMBODIMENT

An embodiment of the method and the apparatus according to this invention will be described below on basis of FIG. 1 to FIG. 10.

Figure 1:
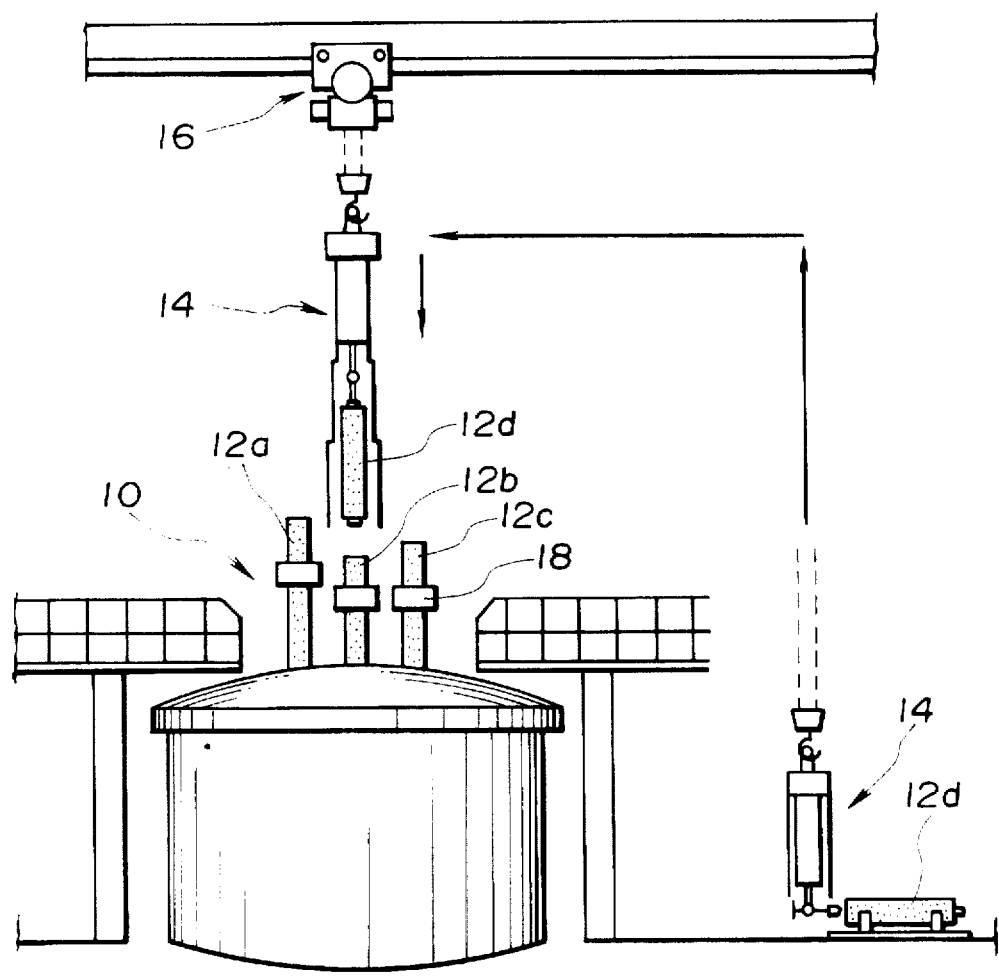
FIG. 1 is a schematic representation wholly illustrating the method and the apparatus according to an embodiment of this invention.

FIG. 1 shows an electric furnace (electric arc furnace), apparatuses used for joining a new electrode to a consumed electrode fitted to the electric furnace, and the procedure for joining both the electrodes in its entirety and conceptionally.

In FIG. 1, numeral 10 denotes the electric furnace, which is provided with three electrodes 12a, 12b and 12c made from graphite.

Each of the electrodes 12a, 12b and 12c is held in a holder hole 20 formed in one end of a holder arm 18 as shown in FIG. 2.

Each of the electrodes 12a, 12b and 12c fitted to the electric furnace 10 is formed with a threaded hole 22 in the upper end thereof as hown in FIG. 2, and so designed as to be joined with a new electrode 12d by screwing a nipple 24 previously fitted to the new electrode 12d into the threaded hole 22 thereof.

The nipple 24 is made from graphite of the same quality as the electrodes 12a–12d, formed with an external screw thread on the outer periphery thereof, and so designed that a half length of the nipple 24 may be screwed into a threaded hole 26 of the new electrode 12d and the other half length of the nipple 24 may be screwed into the threaded hole 22 of the electrode 12a, 12b or 12c of the electric furnace 10.

Numeral 14 denotes a joining apparatus used for adding the new electrode 12d to the electrode 12a, 12b or 12c of the electric furnace 10, and numeral 16 denotes a crane used for lifting and transporting the new electrode 12d as a carrier means in FIG. 1. The crane 16 is disposed with a laser beam projector 15 so as to send the laser beam directly therebelow as shown in FIGS. 6 and 8.

Figure 6:
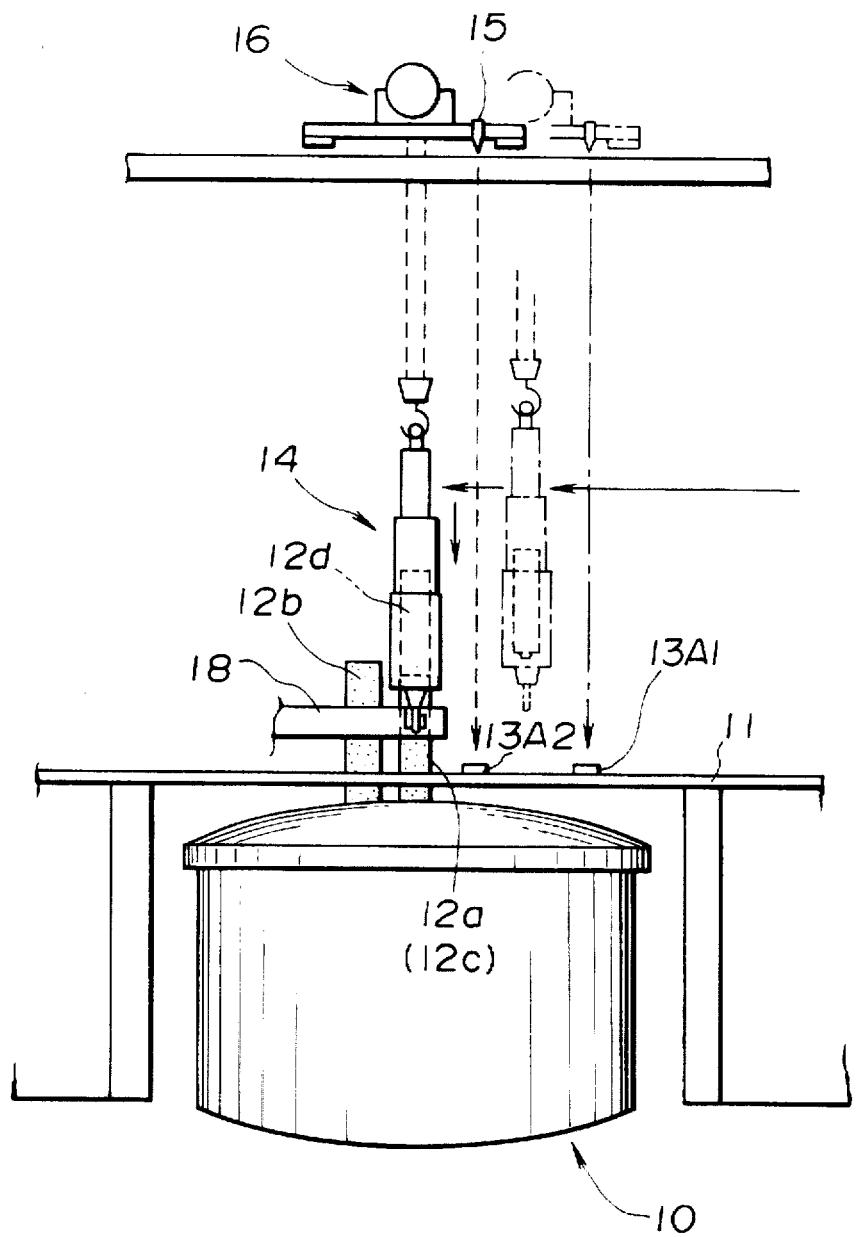
FIG. 6 is a schematic representation wholly illustrating the procedure for positioning the electrode in the method according to the embodiment of this invention.
Figure 7:
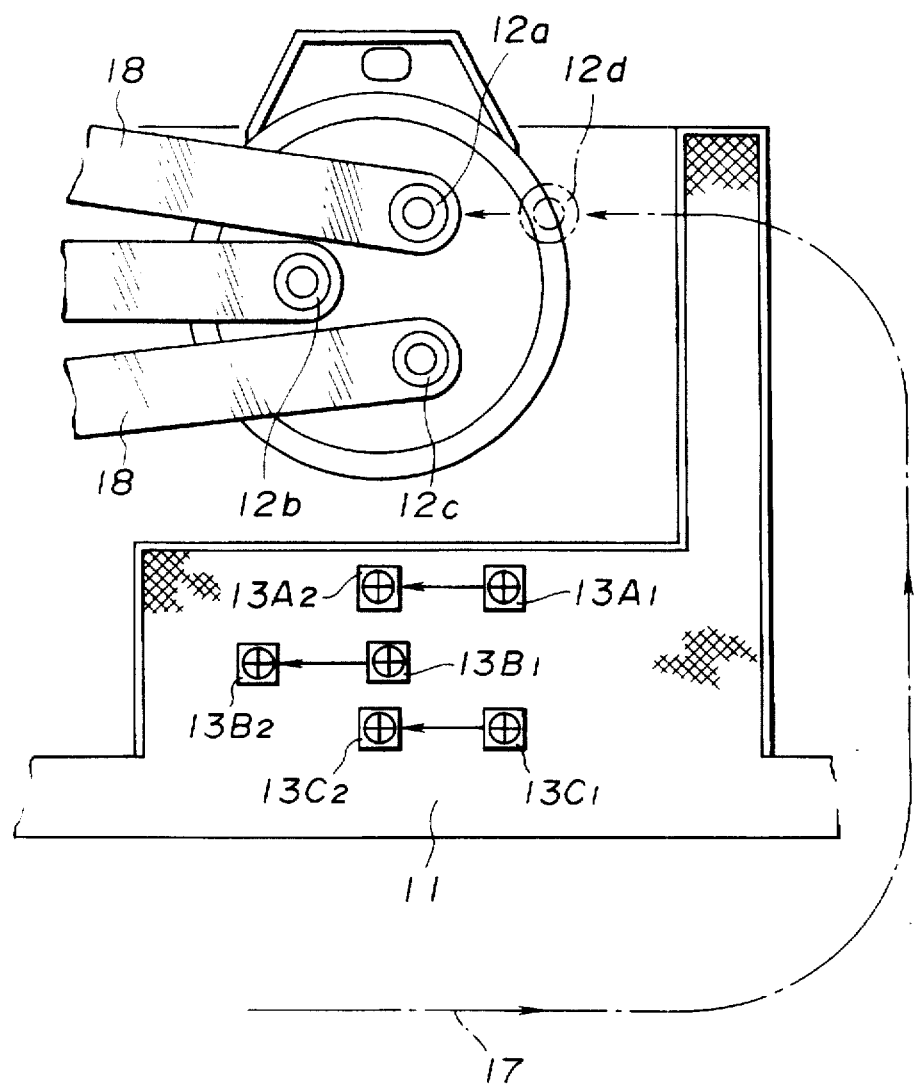
FIG. 7 is a schematic plan view illustrating the procedure for positioning the electrode shown in FIG. 6.
Figure 8:
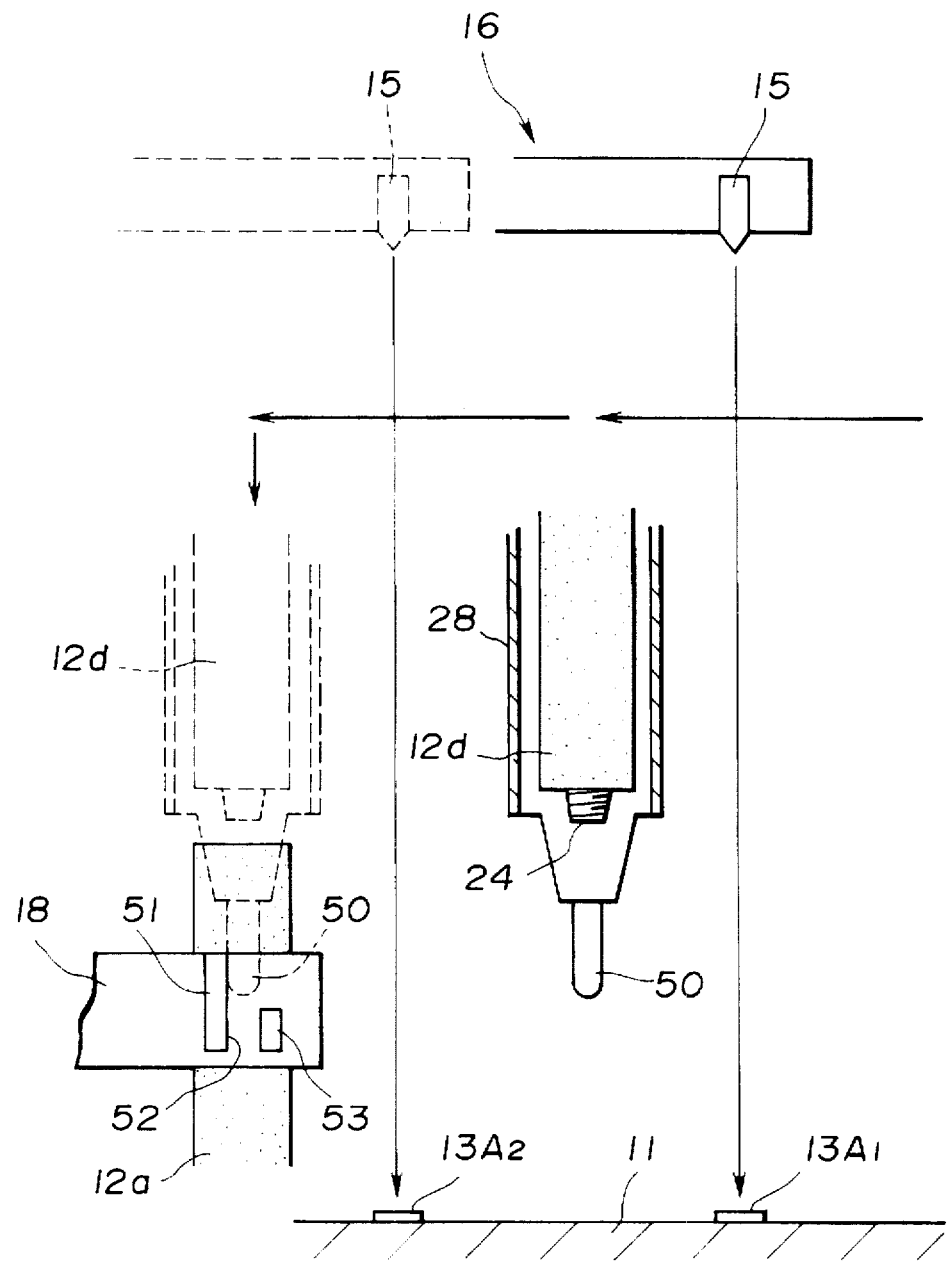
FIG. 8 is an enlarged schematic representation illustrating the procedure for positioning the electrode shown in FIG. 6.

The other side, a deck plate 11 (stationary member) disposed fixedly in the vicinity of the electric furnace 10 is provided with positioning markers $13A_1$, $13A_2$, $13B_1$, $13B_2$, $13C_1$ and $13C_2$ on the upper face thereof as shown in FIGS. 6 to 8.

Among them, the positioning marker $13A_1$ and $13A_2$ corresponds to the electrode 12a, and the positioning markers $13B_1$, $13B_2$ and $13C_1$, $13C_2$ correspond to the electrodes 12b and 12c, respectively.

The positioning markers $13A_2$, $13B_2$ and $13C_2$ of the aforementioned markers are so located in advance that a center line (axis) of the electrode 12d held by the joining apparatus 14 may coincide exactly with center lines of the electrodes 12a, 12b and 12c of the electric furnace 10, respectively when the laser beam from the projector 15 shines on the respective positioning markers.

The joining apparatus 14 is provided with a geared electric motor 38 housed in a cylindrical casing 32 for rotationally driving the new electrode 12d and a transmission shaft (transmission means) 40 connected to the motor 38 for transmitting driving force of the motor 38 to the electrode 12d as shown in FIGS. 2A and 2B.

The transmission shaft 40 is provided with a metallic nipple 42 as a connector means on the lower side thereof, and connected with the new electrode 12d by screwing the metallic nipple 42 into the threaded hole 22 of the electrode 12d, which is suspended by the joining apparatus 14 through the transmission shaft 40.

On the other side, the transmisison shaft 40 is provided with a threaded shaft 44 on the upper side thereof, and the treaded shaft 44 is screwed into a nut mumber 46 secured in the cylindrical casing 32 to form a screw pair.

Figure 3:
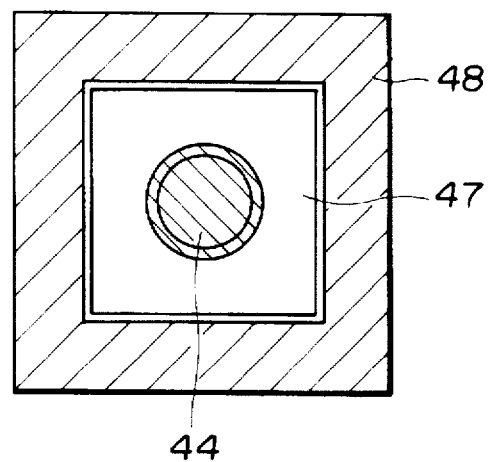
FIG. 3 is a horizontal sectional view illustrating the connecting structure between geared motor and transmission shaft shown in FIGS. 2A and 2B.

The threaded shaft 44 is formed with a square head 47 on the upper end thereof, which is fitted in a square cylinder 48 rotating together with the motor 38 so as to move in the axial direction and not to rotate against the square cylinder 48 as also shown in FIG. 3. Namely, the new electrode 12d connected with the transmission shaft 40 through the metallic nipple 42 is so structured as to be lowered through the screw pair at the same time of rotation by actuating the motor 38, thereby screwing the nipple 24 of the new electrode 12d into the threaded hole 22 of the electrode 12a, 12b or 12c.

The cylindrical casing 32 housed with the geared motor 38 is provided with a retractable hood having an outer cylinder 28 and an inner cylinder 30 for covering the transmission shaft 40 and the new electrode 12d suspended by the shaft 40. The outer and inner cylinders 28 and 30 are so structured as to move up and down by winding up and down a wire 36 through geared motors 34 disposed on the upper side of the cylindrical casing 28.

Namely, the electrode 12d is exposed when the outer and inner cylinders 28 and 30 are lifted by winding up the wire 36 as shown in FIG. 2B, and covered with the cylinders 28 and 30 stretched telescopically by winding down the wire 36 as shown in FIG. 2A.

Furthermore, the outer cylinder 28 of the retractable hood is provided with a projection 50 protruding downwardly on the lower end thereof, and the holder arm 18 of the electric furnace 10 is provided with a groove 52 between a pair of vertical ribs 51 and 53 formed on the outer periphery thereof. The projection 50 is designed so as to be entered in the groove 52 and to be engaged with each other when the axis of the new electrode 12d coincides with the axis of the consumed electrode 12a, 12b or 12c of the electric furnace 10 as also shown in FIG. 8.

The vertical rib 53 is formed shortly as compared with the rib 51 so as to open the groove 52 rightwardly on the upper side of the groove 52, whereby it is possible to simplify the engagement of the projection 50 of the joining apparatus 14 with the groove 52 of the holder arm 18 by lowering the joining apparatus 14 after the projection 50 comes in contact with the upper part of the longer vertical rib 51 as shown in FIG. 8.

In addition to above, the groove 52 formed between the vertical ribs 51 and 53 also serves to hold the joining apparatus 14 so as not to rotate together with the electrode 12d at the time of actuating the electric motor 38.

Figure 4A:
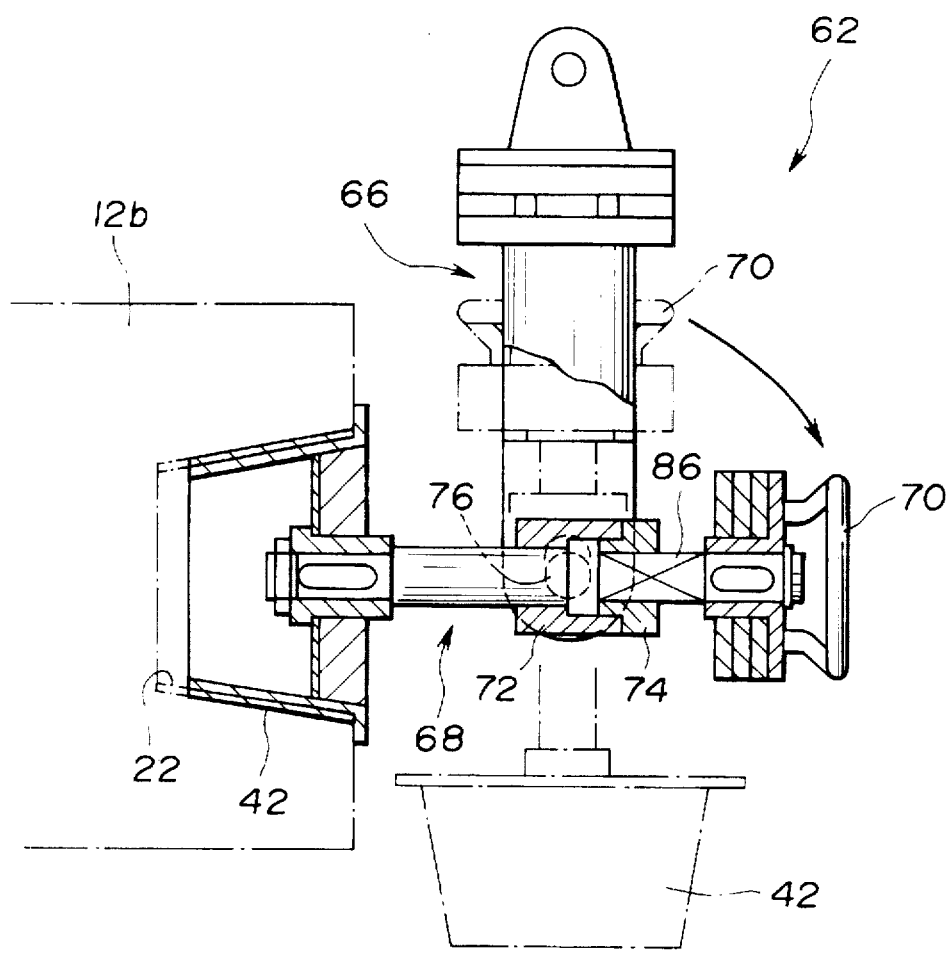
FIGS. 4A and 4B are enlarged details illustrating the lower portion of the transmission shaft shown in FIGS. 2A and 2B.
Figure 4B:
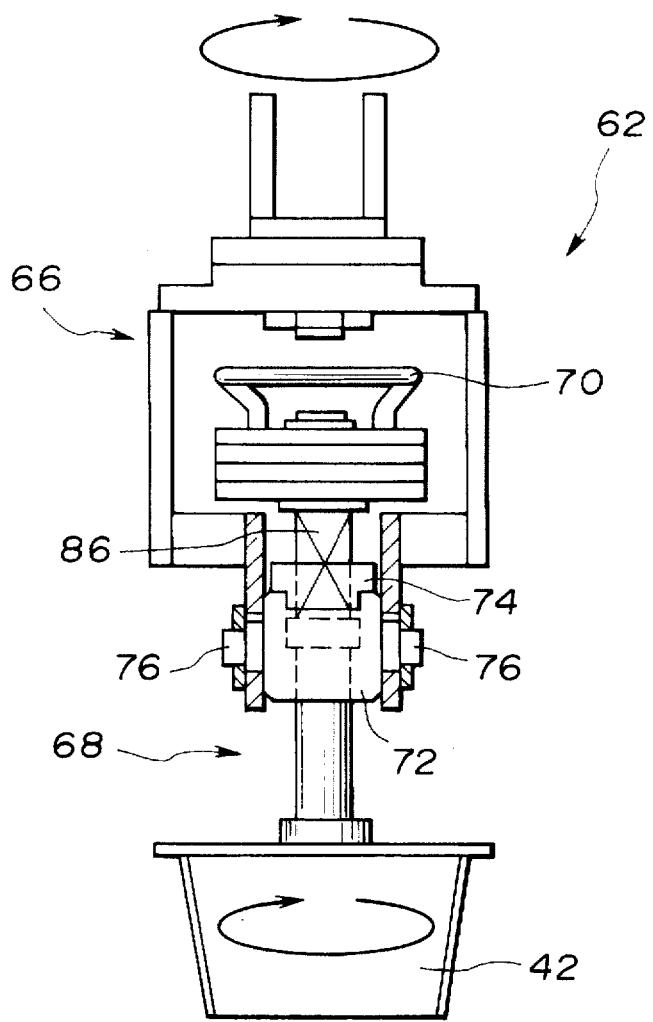

The transmission shaft 40 consists of an upper portion 60, a lower portion 62 and a joint 64 connecting the upper and the lower portions 60 and 62 as shown in FIGS. 2A and 2B, and the lower portion 60 is, as shown in FIGS. 4A and 4B, further devided into a first portion 66 on the upper side and a second portion 68 on the lower side.

The second portion 68 is provided with the metallic nipple 42 on the lower end, and provided with a handle 70 on the upper end thereof, respectively.

The first and the second portions 66 and 68 are connected with each other through clutch members 72 and 74, and a rotatable shaft 76 disposed on the clutch member 72 by which a rotatable joint means is formed.

Figure 5A:
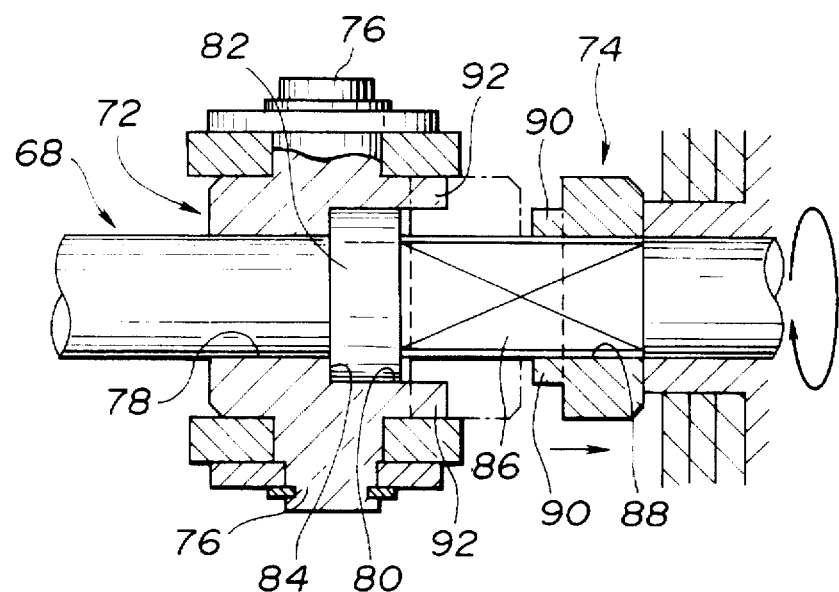
FIGS. 5A and 5B are detail views illustrating the neighboring structure of the rotatable shaft of the lower portion of the transmission shaft shown in FIGS. 4A and 4B.
Figure 5B:
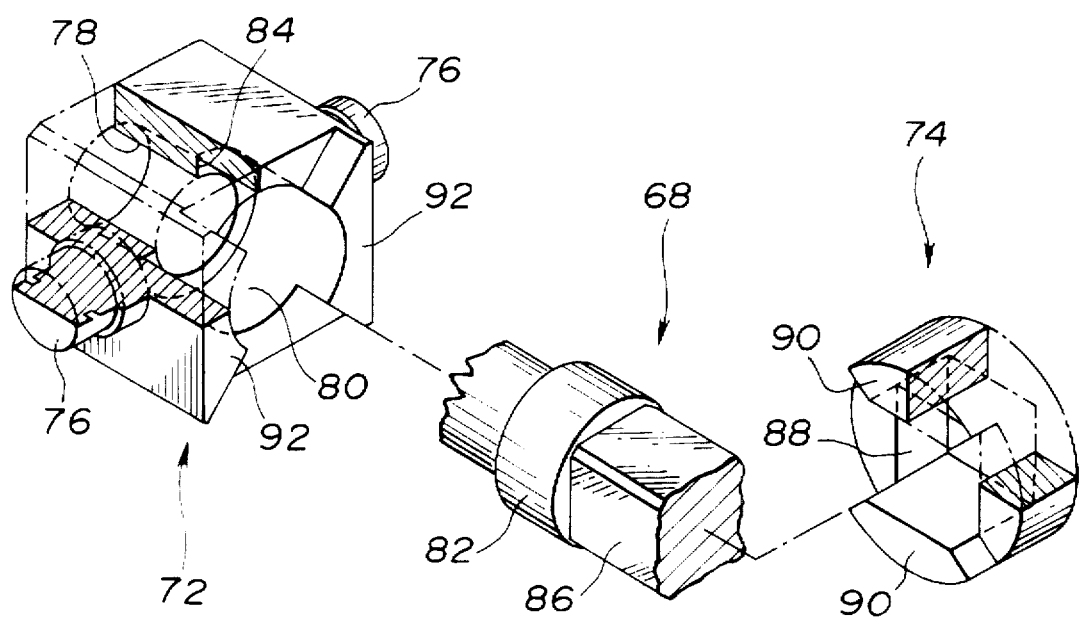

The clutch member 72 has a block-like shape with a stepped hole 78 in the center thereof, and the stepped hole 78 is fitted with the second portion 68 as also shown in FIGS. 5A and 5B.

The stepped hole 78 is provided with a larger hole part 80 on the upper side thereof in FIG. 4B (on the right side in FIGS. 4A and 5A), and the larger hole part 80 is housed with a flange 82 of the second portion 68. Namely, the second portion 68 is supported so as not to fall off from the clutch member 72 by the flange 82 in contact with a stepped face 84 of the stepped hole 78.

The second portion 68 is formed with a leveled part 86 having a square section, and another clutch member 74 is fitted on the leveled part 86 so as to move in the axial direction and not to rotate against the second portion 68 by means of a square hole 88 of the clutch member 74.

The clutch member 74 is provided with a pair of teeth 90 projecting downwardly in FIG. 4B, and the clutch member 72 is provided with a pair of teeth 92 projecting upwardly in FIG. 4B. The teeth 90 are so structured as to be engaged with or disengaged from the teeth 92 by moving the clutch member 72 along the leveled part 86 of the second portion 68 in the axial direction.

The rotatable shaft 76 provided on the clutch member 72 is held in the horizontal position as shown in FIG. 4B so that the second portion 68 may be rotate about the horizontal axis in its whole body.

Additionally, it is preferable to engage the teeth 90 and 92 of the clutch members 72 and 74 with some play in the rotational direction.

Next, an explanation will be given about the procedure for joining the new electrode 12d to the consumed electrode 12a of the electric furnace 10.

In general, the new electrode 12d to be added to the consumed electrode 12a (12b or 12c) of the electric furnace 10 is stored in the lying state on the floor as shown on the right side in FIG. 1.

The new electrode 12d is set to the joining apparatus 14 according to the following procedure.

In the first place, the joining apparatus 14 is moved horizontally to the position where the electrode 12d is stored by the crane 16, and then lowered.

After the joining apparatus 14 is lowerd to the suitable position, the electrode 12d is set to the joining apparatus according to the procedure illustrated in FIGS. 1A and 4A.

Namely, the clutch member 72 of the transmission shaft 40 provided in the joining apparatus 14 is moved toward the handle 70 along the leveled part 86 of the second portion 68, thereby disengaging the clutch member 74 from the different clutch member 72 (FIG. 4A).

Subsequently, the whole of the second portion 68 is turned about the rotatable shaft 76 to make it level, and the metallic nipple 42 is screwed into the threaded hole 22 of the electrode 12d by rotating the second portion 68 in its whole body through the handle 70.

After screwing the metallic nipple 42 into the threaded hole 22 sufficiently, the clutch member 74 is engaged with the clutch member 72 by returning the clutch member 74 to the original position.

The setting procedure of the electrode 12d with the joining apparatus 14 is completed as described above, and then by lifting the joining apparatus 14 through the crane 16, the electrode 12d is set up to the standing position from the lying position at the same time the second portion 68 of the transmission shaft 40 turns about the rotatable shaft 76 and lifted upwardly in a state of being suspended by the joining apparatus 14.

In the second place, the electrode 12d is transported by the crane 16 along a line 17 shown with a chain line in FIG. 7.

In a case in which the new electrode 12d is joined to, for example, the consumed electrode 12a of the electric furnace 10, the crane 16 is moved to the position where the laser beam projector 15 disposed on the crane 16 shines on the positioning marker $13A_1$ disposed on the deck plate 11 provided stationary in the vicinity of the electric furnace 10, then moved to the position where the projector 15 throws exactly the laser beam on the positioning marker $13A_2$ and stopped at this position as holding the electrode 12d at the proper level as also shown in FIG. 6 and FIG. 8.

In this state, the center lines of the new and the consumed electrodes 12d and 12a coincide with each other and the projection 50 of the joining apparatus 14 comes in contact with the longer vertical rib 51 formed on the outer periphery of the holder arm 18 as shown with a broken line in FIG. 8.

At the same time of lowering the electrode 12d together with the joining apparatus 14 in some degree, the electrode 12d is driven rotationally by actuating the electric motor 38 of the joining apparatus 14.

Whereby, the nipple 24 fitted to the lower end of the new electrode 12d is screwed into the threaded hole 22 of the consumed electrode 12a and both the electrodes 12a and 12d are joined with eath other.

In this time, the projection 50 of the joining apparatus 14 enteres into the groove 52 between the longer and the shorter vertical ribs 51 and 53 formed on the outer periphery of the holder arm 18 and catches counteraction caused by the rotation of the electrode 12d.

Figure 9:
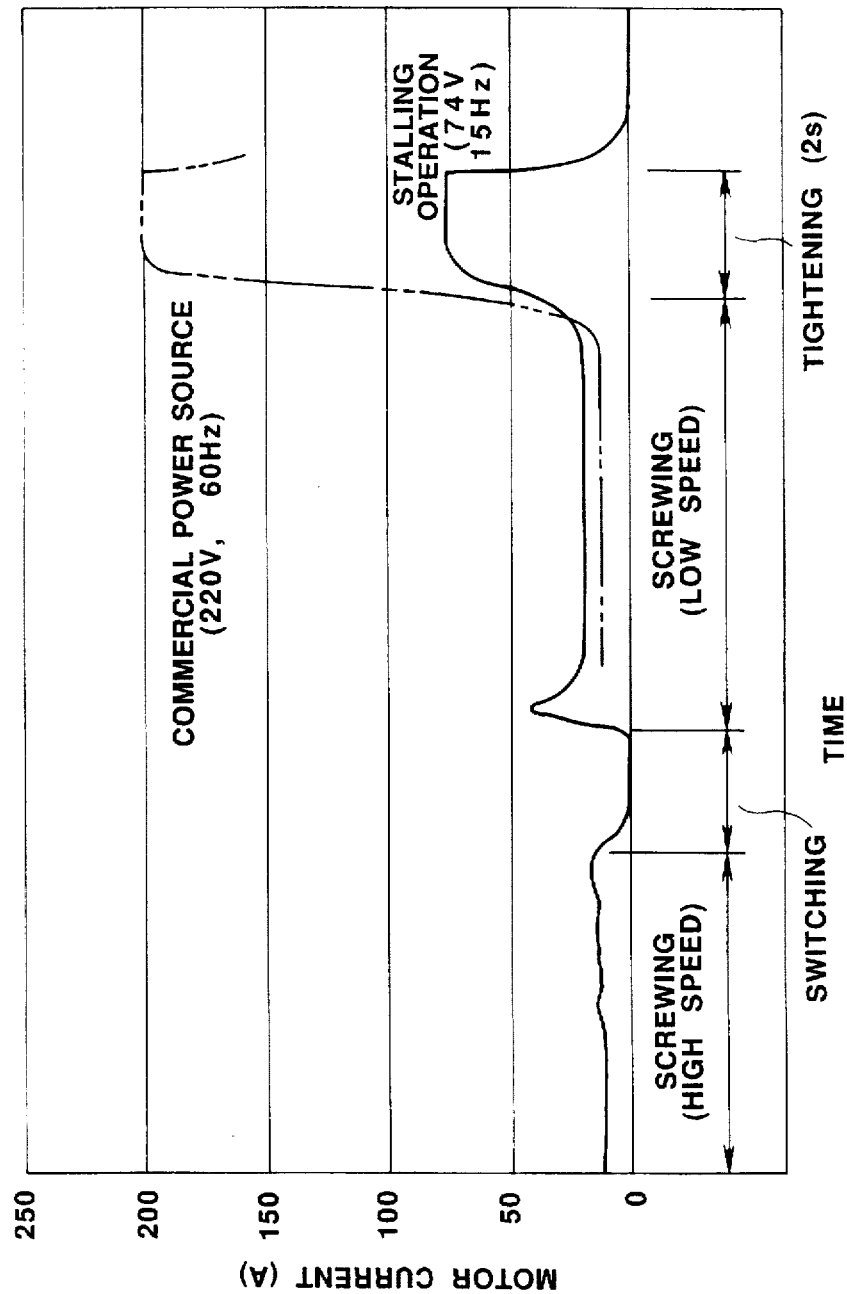
FIG. 9 is a graph illustrating the relationship between progress of the joining and ensuing fluctuation of the electric current flowing in the electric motor in the method according to the embodiment of this invention.

The electric motor 38 is operated in the high speed at the beginning, and switched into the low speed operation when the nipple 24 and the threaded hole 22 are engaged loosely with each other as shown in FIG. 9. The low speed operation of the motor 38 is continued.

When the nipple 24 is tightened sufficiently in the threaded hole 22 at certain point of time, the load applied on the motor 38 increases abruptly and the motor 38 is put into the overload state and falls into the stalled state.

FIG. 4 illustrates fluctuation of the electric current flowing in the motor 38, the electric current does not flow so much since the load does not applied on the motor 38 substantially in the high speed operation at the beginning of the screwing, the load does not increase so much and there is merely some increase of the current also in the low speed operation at the next step as shown in FIG. 9.

In the high load (overload) state in which the nipple 24 is screwed and tightened into the threaded hole 22 sufficiently, the electric current increases abruptly, and the current curve shows the constant value after rising up. The operation in such the state is stalling operation, and a large current flows in the motor 38.

If the motor 38 in the stalled state is actuated by directly connecting the motor 38 to the commercial power source (220 V, 60 Hz), torque output from the motor 38 increases excessively and the motor 38 overheats and is damaged owing to the overcurrent flowing in the motor 38 as shown with a two-dot chain line in FIG. 9.

It is confirmed that the output torque (stalling torque) decreases with decrease of a stalling current (an electric current flowing in the motor in the stalled state), the stalling current decreases with decrease of the voltage, and the output torque obtained by the same stalling current changes (increases) by lowering the frequency of the current. Therefore, in the method according to this invention, the torque and the electric current flowing in the motor 38 in the stalled state are controlled properly by regulating the voltage and the frequency of the electric current supplied to the motor 38 through an invertor.

Figure 10:
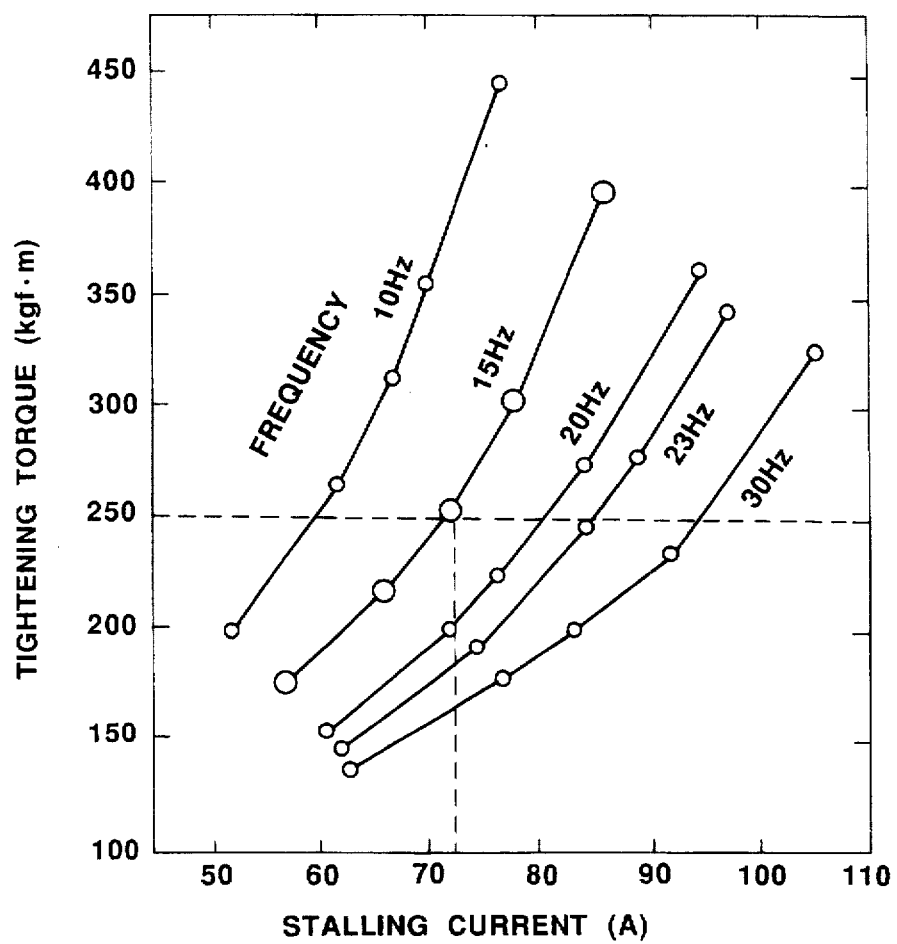
FIG. 10 is a graph illustrating the effect of the electric current and its frequency flowing the electric motor in a stalled state on the tightening torque applied on the electrodes in the method according to the embodiment of this invention.
Figure 11:
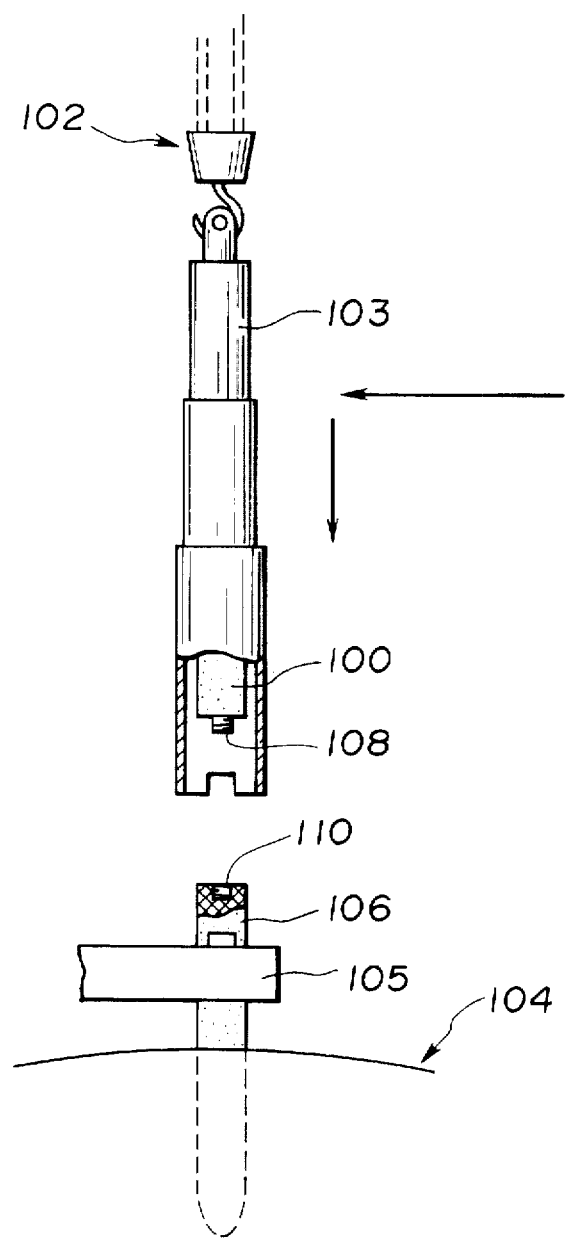
FIG. 11 and FIG. 12 are schematic representations of the conventional procedure for joining the electrodes of the electric furnace.
Figure 12:
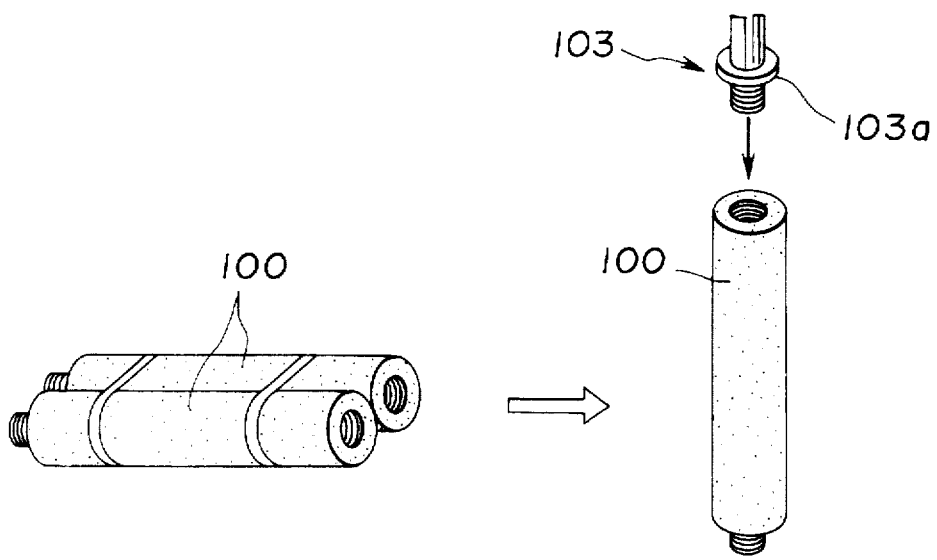

FIG. 10 is a graph showing an effect of the stalling current and its frequency on the output torque (tightening torque).

In FIG. 10, the change of the stalling current under the same frequency is based on the change of the voltage. Namely, the stalling current increases with increase of the voltage and decreases with decrease of the voltage.

In this embodiment, a 7.5 KW motor (reduction gear ratio: 1/59) is used as the motor 38 and torque of 250 kgf-m is required to tighten both the electrodes 12a and 12d. The tightening torque of 250 kgf-m can be obtained under the frequency of 10 to 30 Hz, but the stalling current changes according to the frequency.

Therefore, the motor 38 is supplied with electric power of 15 Hz frequency in order to descrease the stalling current sufficiently so as to prevent the motor 38 from the overheat, and the voltage is controlled so as to decrease the stalling current down to 72A approximately in this embodiment.

The tightening torque becomes constant at 250 kgf-m by operating the motor 38 in the stalled state under such the condition, whereby the nipple 24 of the new electrode 12d is screwed into the threaded hole 22 of the consumed electrode 12a and both the electrodes 12d and 12a are connected with each other.

It is preferable to lower the rotational speed of the electrode 12d at the time of the screwing through the motor 38 because degree of the tightening varies widely under the influence of the forth of rotational inertia if the electrode 12d is rotated at the high rotational speed. It is desirable that the rotational speed is 20 rpm or less.

Although the invention has been described in its preferred embodiment, it is possible to done various modification according to knowledge of those skilled in the art without departing from the sprit and scope of this invention.

For example, the laser beam projector 15 may be disposed on the deck plate 11, and the positioning marker 13 may be disposed on the side of the crane 16.

Further more, it is also possible to stop the crane 16 at a desired position exactly according to a signal from a photo sensor disposed on the position corresponding to the positioning marker.

As described above, according to this invention, it is possible to set the new electrode in the lying state on the floor very easily and possible to simplify the lifting work of the new electrode using the joining apparatus.

Furthermore, it is possible to transport the new electrode into the position just above the consumed electrode of the electric furnace speedily and exactly by moving the crane so as to throw the laser beam on the positioning marker.

In addition to above, it is possible to join the both electrodes at proper tightening torque without the overheat of the motor by controlling the motor in the stalled state so as to decrease the electric current and its frequency.

What is claimed is:

1. A joining apparatus for joining one end of a vertically suspended new electrode to a consumed electrode vertically disposed in an electric furnace, comprising:

an electric motor for generating a rotational driving torque for rotating the vertically suspended new electrode about the axis thereof;

connector means for connection with the new electrode at an end away from said one end by means of a screw pair;

transmission means mechanically connected with said electric motor and said connector means for transmitting the rotational driving torque of the electric motor to said connector means;

said transmission means including rotatable joint means for coupling said connector means and said transmission means; and a cylindrical hood mounted on said joining apparatus and retractable telescopically with respect to said new electrode for covering said new electrode which is suspended from said transmission means through the connector means and the rotatable joint means;

said cylindrical hood being further provided with a projection at the lower end thereof which is engageable in a groove formed between a first vertical rib and a second vertical rib which is shorter than said first vertical rib, disposed on a holder arm which supports the consumed electrode in the electric furnace when said electrodes are aligned with each other.

* * * * *